US012621202B2

(12) United States Patent　　　　(10) Patent No.:　US 12,621,202 B2
Shetty et al.　　　　　　　　　　　(45) Date of Patent:　　　May 5, 2026

(54) EDGE-BASED UNIFIED ENDPOINT MANAGEMENT FOR MANAGEMENT CONTINUITY

(71) Applicant: Omnissa, LLC, Mountain View, CA (US)

(72) Inventors: Rohit Pradeep Shetty, Bangalore (IN); Ramanandan Nambannor Kunnath, Bangalore (IN); Madhavan Kara Bhattathiri, Banglaore (IN); Erich Stuntebeck, Atlanta, GA (US)

(73) Assignee: Omnissa, LLC, Mountain View, CA (US)

( * ) Notice: Subject to any disclaimer, the term of this patent is extended or adjusted under 35 U.S.C. 154(b) by 21 days.

(21) Appl. No.: 18/607,348

(22) Filed: Mar. 15, 2024

(65) Prior Publication Data

US 2025/0112932 A1　Apr. 3, 2025

(30) Foreign Application Priority Data

Sep. 29, 2023　(IN) ............................. 202341065760

(51) Int. Cl.
　*H04L 41/0663*　(2022.01)
　*H04L 41/042*　(2022.01)
　*H04L 41/046*　(2022.01)
　*H04L 41/0668*　(2022.01)

(52) U.S. Cl.
　CPC ........ *H04L 41/0663* (2013.01); *H04L 41/042* (2013.01); *H04L 41/046* (2013.01); *H04L 41/0668* (2013.01)

(58) Field of Classification Search
　None
　See application file for complete search history.

(56) References Cited

U.S. PATENT DOCUMENTS

2021/0058283 A1 * 2/2021 Rivera ................. H04W 76/18
2022/0021585 A1 * 1/2022 Barton ................. H04L 47/125

* cited by examiner

*Primary Examiner* — Boris D Grijalva Lobos
(74) *Attorney, Agent, or Firm* — Kim & Stewart LLP

(57) ABSTRACT

The present disclosure fallback management of managed devices utilizing edge management servers that periodically poll a primary management server. If the primary management server is unreachable, the edge management servers can assume management of a population of managed devices.

18 Claims, 3 Drawing Sheets

EDGE-BASED UNIFIED ENDPOINT MANAGEMENT FOR MANAGEMENT CONTINUITY

CROSS-REFERENCES

This application claims the benefit of Indian Patent Application No. 202341065760, entitled "EDGE-BASED UNIFIED ENDPOINT MANAGEMENT FOR MANAGEMENT CONTINUITY," filed on Sep. 29, 2023, of which is hereby incorporated by reference in its entirety.

BACKGROUND

In an enterprise environment, users often use multiple devices for various purposes. For example, a user might have a laptop, a tablet, a phone, and potentially other devices that are utilized to access enterprise resources. Information technology administrators can utilize a management framework that allows for user devices to be enrolled with a management service that can enforce enterprise security and compliance policies. The management service can also facilitate providing software updates and patches to the enrolled devices to further information security and compliance priorities. In some cases, the management service might be offline for extended periods of time, during which devices might be unable to obtain management commands or other data from the management service. An offline management service can be in a situation where it is unable to provide updates, management commands, and other data updates from the management service to managed devices, leading to a period of time where the managed devices are potentially in a compromised state.

BRIEF DESCRIPTION OF THE DRAWINGS

For a more complete understanding of the embodiments and the advantages thereof, reference is now made to the following description, in conjunction with the accompanying figures briefly described as follows.

DETAILED DESCRIPTION

Figure 1:
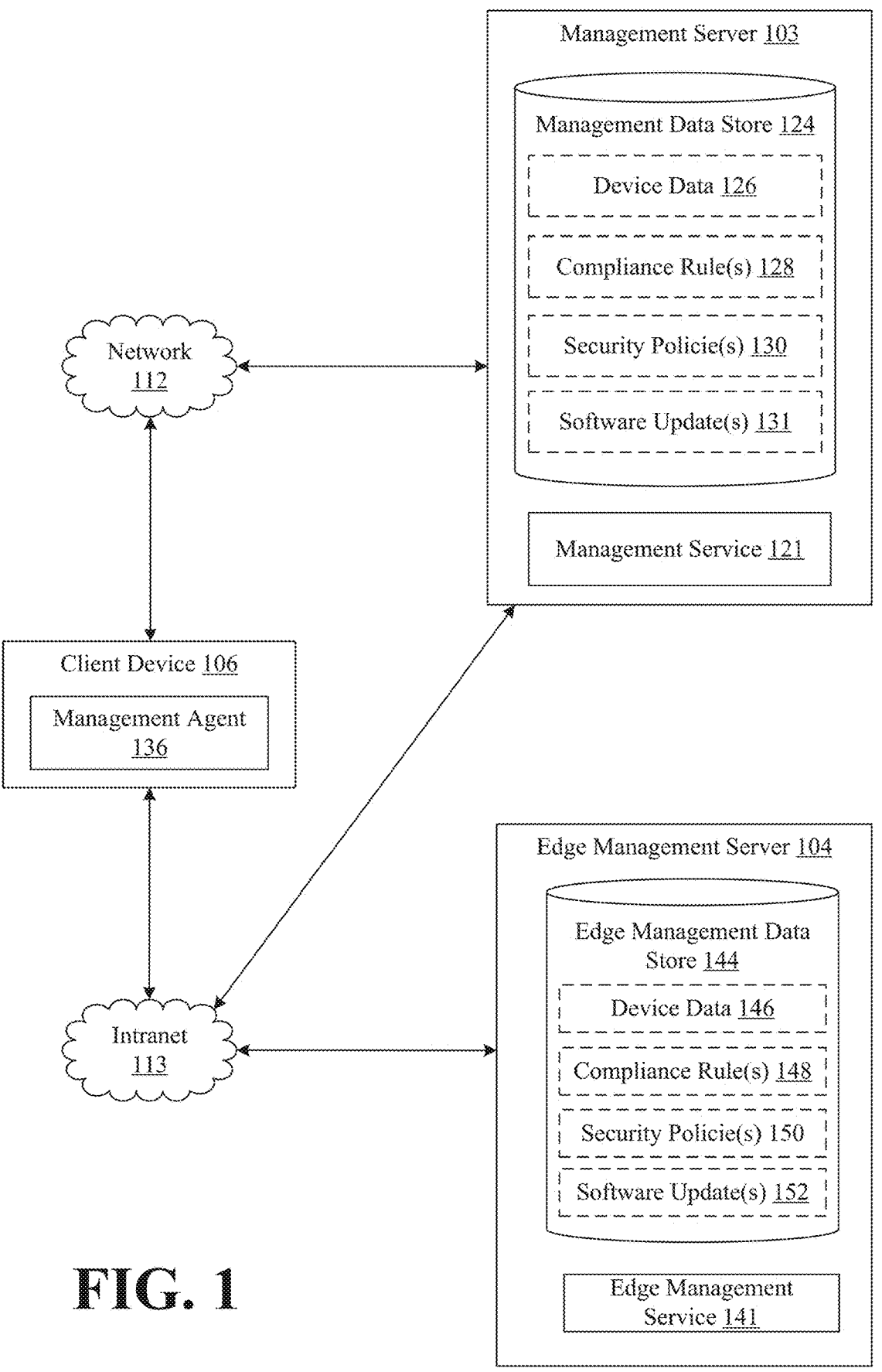
FIG. 1 shows an example of a networked environment 100 according to various embodiments of the present disclosure.

The present disclosure relates to providing edge-based unified endpoint management servers to facilitate management of managed devices by a management service. Users in an enterprise environment can have multiple devices that are enrolled as managed devices. For example, a user might have a tablet device, a laptop computer, a smartphone, a wearable device, and potentially other devices that are enrolled with the management service. The devices can be managed by a management service that is tasked with deploying security policies, security keys or certificates, software updates, and enforcing other enterprise policies on a client device that can be specified by administrators of the management service.

To effectively manage devices, the management service often relies upon device "check-ins" whereby managed devices, or a component installed or running on a managed device, periodically reports device status information to the management service. These device check-ins can also be referred to as device heartbeat data. A device check-in can take the form of a device identifier along with device status information that the management service can monitor, such as operating system version, network address, geolocation data, and other data from which the management service can determine whether the device requires any action to be taken on the device. In response to receiving a device check-in, the management service can determine whether any needed updates to policies or software on the managed device are needed and respond to the managed device with the updates or policies. Or, the management service can respond with instruction on where and how a management component on the client device can retrieve a software update, or what modifications to the configuration of the client device that should be made by the management component.

The management service, and a server or cluster powering its operation, has become a central point of command for enterprises to remotely manage devices, continuously check device compliance, push down management polices, obtain device state information from managed devices, and perform other management tasks. In the modern world, we have seen that it's not just end user devices which are susceptible to attacks but even previously secure server instances. Thus, if the UEM Server goes down along with its services or is unreachable, the whole of the WS1 ecosystem and its functionalities are adversely impacted. This does not just adversely impact enterprise security but even impacts business continuity at enterprises as access to apps, documents and devices might no longer be available to employees.

However, a server or cluster of servers powering the management service might become inaccessible due to network or other technical issues, which could impact the ability of managed devices to obtain or report critical data, such as device state information, management policies, or other data.

Examples of the disclosure provide an edge management service that can be executed by one or more edge management servers to supplement the management service that is tasked with device management. Edge-based fallback servers can provide fallback unified endpoint management (UEM) services. The edge management servers can be localized lightweight UEM servers loaded with management polices configured by the admin to operate as temporary management servers until a primary management server or cluster is back online. In some cases, an edge management server can be accessible reachable via an Intranet connection by managed devices that located in close proximity to a limited number of users/devices to which they are assigned to manage. With these edge management servers accessible within an Intranet, the chances of such as server being impacted by exploits are comparatively lesser while also providing faster throughput to managed devices. As part of our solution, a portion of a management data store can be replicated to edge management servers. The management data store contains details of all managed devices whereas the edge management server can contain information of managed devices for which the server is assigned as a fallback UEM server. Each edge data store can store only details of X number of users or devices, with X being determined based upon one or more proximity factors.

For example, edge management servers might be configured and available at a per-floor or a per-location basis based on the enterprise admin choice. Each of these edge management servers can serve a small number of users and their corresponding devices; for example, 5-50 users based on their respective compute/storage capacities.

FIG. 1 shows an example of a networked environment 100 according to various embodiments. The networked environment 100 can include a management server 103, an edge management server 104, and a managed device 106 in communication through a network 112. The networked environment also includes an offline client device 109 that is in communication directly with the managed device 106 but that cannot communicate with the management server 103 via the network 112. In other words, the offline client device 109 lacks access or the ability to access the network 112. The network capability of the offline client device 109 might be disabled or non-functional, for example.

The network 112 can include the Internet, extranets, wide area networks (WANs), local area networks (LANs), wired networks, wireless networks, other suitable networks, or any combination of two or more such networks. The networks can include satellite networks, cable networks, Ethernet networks, telephony networks, and other types of networks. The network 112 can include wide area networks (WANs) and local area networks (LANs). These networks can include wired or wireless components or a combination thereof. Wired networks can include Ethernet networks, cable networks, fiber optic networks, and telephone networks, such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (e.g., WI-FI®), BLUETOOTH® networks, microwave transmission networks, as well as other networks relying on radio broadcasts. The network 112 can also include a combination of two or more networks 112. Examples of networks 112 can include the Internet, intranets, extranets, virtual private networks (VPNs), and similar networks.

The intranet 113 local area networks (LANs), wired networks, wireless networks, other suitable networks, or any combination of two or more such networks that can be accessible by the edge management server 104, the managed device 106 and the management server 103. In some cases, the intranet 113 and network 112 both be accessible by devices outside of the respective networks. In other cases, the intranet 113 can be a network that is internal to an enterprise an only accessible by devices that are inside of an enterprise firewall or router.

The management server 103 can be embodied as one or more computers, computing devices, or computing systems. In certain embodiments, the management server 103 can include one or more computing devices arranged, for example, in one or more servers or computer banks. The computing device or devices can be located at a single installation site or distributed among different geographical locations. The management server 103 can include a plurality of computing devices that together embody a hosted computing resource, a grid computing resource, or other distributed computing arrangement. In some cases, the management server 103 can be embodied as an elastic computing resource where an allotted capacity of processing, network, storage, or other computing-related resources vary over time. As further described below, the management server 103 can also be embodied, in part, as certain functional or logical (e.g., computer-readable instruction) elements or modules as described herein.

The management server 103 can operate as an environment for mobile device management or a Unified Endpoint Management (UEM) platform that can manage the managed device 106 and secondary client device(s) 109. In that context, the management server 103 can execute a management service 121 and potentially other applications. To this end, the operating system and application ecosystem associated with managed devices can provide various APIs and services that allow client managed devices to be enrolled as managed devices with the management service 121. The management server 103 can also include or have access to a management data store 124.

The management data store 124 can include memory of the management server 103, mass storage resources of the management server 103, or any other storage resources on which data can be stored by the management server 103. The management data store 124 can include one or more databases, such as a structured query language (SQL) database, a non-SQL database, or other appropriate database. The data stored in the management data store 124, for example, can be associated with the operation of the various applications or functional entities described below. The management data store 124 can include device data 126, compliance rules 128, security policies 130, software updates 131 and potentially other data.

Device data 126 can represent information about devices that are enrolled as a managed device with the management service 121. Device data 126 can include a device identifier, a device type, device operating system, a user account associated with the enrolled device, and other identifying or status information about a device. In one example, the device data 126 can identify the last time a managed device has performed a device check-in with the management service 121. Accordingly, the management service 121 can determine which compliance rules 128, security policies 130, software updates 131, and/or other data has not been provided to a managed device since the last device check-in. The management service 121 can then provide the rules, policies or updates to the managed device or instruct the managed device to retrieve them from a particular location.

The device data 126 can also identify the latest compliance rules 128, security policies 130, and/or software updates 131 that have been provided to the enrolled device. The device data 126 can be populated by information received from a managed device when the device performs a device check-in or provides heartbeat data to the management service 121. A management agent 136 running on a managed device 106 or offline client device 109 can perform the device check-in on behalf of the device.

Device data 126 can include records corresponding to client devices 106 that are enrolled as managed devices with the management service 121. A record within device data 126 can include various security settings selected for enforcement on a client device 106 that is enrolled with the management service 121. Accordingly, a device record can include a device identifier associated 124 with a device, such as the client device 106, a security posture, and potentially other data. In some examples, device data 126 can also identify a user associated with a client device 106. A device record can also store other device specific information, such as a device type, operating system type or version, applications that are required or optional for the device, or an enrollment status of the device. In this scenario, the device data 126 can also indicate whether a managed device is a computing device or a peripheral device, such as a printer, scanner, or other device that can be deployed in an environment and associated with a record in a directory service.

Various compliance rules 128 can be enforced on client devices 106 that are enrolled as managed devices with the management service 121. For example, a compliance rule can specify that a client device 106 is required to be off or in a low power "sleep" state during a specified time period. Another compliance rule can specify that a client device 106 is required to be on or in a normal operation "awake" state during a specified time period. As another example, a compliance rule can specify that a client device 106 is prohibited from rendering content that has been designated as confidential.

The management service 121 can administer the operation of managed device 106 and secondary client device(s) 109 that are enrolled or otherwise registered with the management service 121. To this end, the management service 121 can also provide mechanisms for the managed device 106 or an offline client device 109 to enroll or otherwise register with the management service 121. The management can also install or cause to be installed various applications on the managed device 106 or offline client device 109 or for various configuration settings of the managed device 106 or offline client device 109 to be set to a specified value.

The management service 121 can distribute files to a client device 106 that is managed by the management service 121. For example, O/S patches or updates, executable files such as applications or application installers, documents, audio, video, or other content can be distributed by the management service 121 to managed devices.

A managed device 106 or client device, collectively referred to as managed devices or client devices, can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client devices can include one or more displays, such as liquid crystal displays (LCDs), gas plasma-based flat panel displays, organic light emitting diode (OLED) displays, electrophoretic ink ("E-ink") displays, projectors, or other types of display devices.

A managed device 106 is enrolled with the management service 121 and can communicate with the management service 121 via the network 112. The managed device 106 can be configured to execute various applications such as a management agent 136 and potentially other applications. The management agent 136 can be installed on the managed device 106 to facilitate management of the managed device 106 by the management service 121. The management agent 136 can be installed with elevated privileges or be effectuated through operating system APIs to manage the managed device 106 on behalf of the management service 121. The management agent 136 can have the authority to manage data on the managed device 106; install, remove, or disable certain applications; or install configuration profiles, such as VPN certificates, Wi-Fi profiles, email profiles, or other profiles for configuring various functions or applications of the managed device 106 or offline client device 109.

The edge management server 104 can be embodied as one or more computers, computing devices, or computing systems. In certain embodiments, the edge management server 104 can include one or more computing devices arranged, for example, in one or more servers or computer banks. The computing device or devices can be located at a single installation site or distributed among different geographical locations. The edge management server 104 can include a plurality of computing devices that together embody a hosted computing resource, a grid computing resource, or other distributed computing arrangement. In some cases, the edge management server 104 can be embodied as an elastic computing resource where an allotted capacity of processing, network, storage, or other computing-related resources vary over time. As further described below, the edge management server 104 can also be embodied, in part, as certain functional or logical (e.g., computer-readable instruction) elements or modules as described herein.

The edge management server 104 can operate as an environment for mobile device management or a Unified Endpoint Management (UEM) platform that can manage a subset of managed devices 106. In that context, the edge management server 104 can execute an edge management service 141 and potentially other applications. To this end, the operating system and application ecosystem associated with managed devices can provide various APIs and services that allow client managed devices to be enrolled as managed devices with the edge management service 141. The edge management server 104 can also include or have access to an edge management data store 144.

The edge management data store 144 can include memory of the edge management server 104, mass storage resources of the edge management server 104, or any other storage resources on which data can be stored by the edge management server 104. The edge management data store 144 can include one or more databases, such as a structured query language (SQL) database, a non-SQL database, or other appropriate database. The data stored in the edge management data store 144, for example, can be associated with the operation of the various applications or functional entities described below. The edge management data store 144 can include device data 146, compliance rules 148, security policies 150, software updates 152 and potentially other data.

Device data 146 can represent information about devices that are enrolled as a managed device with the edge management data store 144. Device data 146 can include a device identifier, a device type, device operating system, a user account associated with the enrolled device, and other identifying or status information about a device. In one example, the device data 146 can identify the last time a managed device has performed a device check-in with the edge management service 141. Accordingly, the edge management service 141 can determine which compliance rules 148, security policies 150, software updates 152, and/or other data has not been provided to a managed device since the last device check-in. The edge management service 141 can then provide the rules, policies or updates to the managed device or instruct the managed device to retrieve them from a particular location.

The device data 146 can also identify the latest compliance rules 148, security policies 150, and/or software updates 152 that have been provided to the enrolled device. The device data 146 can be populated by information received from a managed device when the device performs a device check-in or provides heartbeat data to the edge management service 141. A management agent 136 running on a managed device 106 or can perform the device check-in on behalf of the device.

Device data 146 can include records corresponding to client devices 106 that are enrolled as managed devices with the edge management service 141. A record within device data 146 can include various security settings selected for enforcement on a client device 106 that is enrolled with the edge management service 141. Accordingly, a device record can include a device identifier associated with a device, such as the client device 106, a security posture, and potentially other data. In some examples, device data 146 can also identify a user associated with a managed device 106. A device record can also store other device specific information, such as a device type, operating system type or version, applications that are required or optional for the device, or an enrollment status of the device. In this scenario, the device data 146 can also indicate whether a managed device is a computing device or a peripheral device, such as a printer, scanner, or other device that can be deployed in an environment and associated with a record in a directory service.

In examples of this disclosure, a respective edge management server 104 can be assigned to act as a fallback management server for a subset of managed devices 106 that are enrolled with the management server 103. Accordingly, the edge management service 141 can synchronize the edge management data store 144 with the management data store 124 for device data 126 corresponding to a subset of the devices that the edge management service 141 is designated as a fallback management server. The edge management service 141 can determine whether the management service 121 is unreachable or out-of-service and assume management of a subset of the managed devices 106 in the event that the management server 103 becomes unreachable via the intranet 113. In one example, the edge management service 141 can periodically ping or poll the management service 121 to determine whether the management service 121 is reachable via the intranet 113. An assumption can be made that if the edge management service 141 cannot communicate with the management service 121 via the intranet 113, that managed devices 106 also are unable to communicate with the management service 121 via the network 112.

Accordingly, the edge management service 141 can instruct the managed devices 106 for which it is assigned to operate as a fallback management service to communicate with the edge management service 141 as their respective management authorities until the management service 121 is reachable. When the edge management service 141 determines that the management service 121 is reachable, the edge management service 141 can instruct the managed devices 106 resume communications with the management service 121 as their respective management authorities.

Various compliance rules 148 can be enforced on client devices 106 that are enrolled as managed devices with the management service 121. For example, a compliance rule can specify that a client device 106 is required to be off or in a low power "sleep" state during a specified time period. Another compliance rule can specify that a client device 106 is required to be on or in a normal operation "awake" state during a specified time period. As another example, a compliance rule can specify that a client device 106 is prohibited from rendering content that has been designated as confidential.

Like, the management service 121, the edge management service 141, when operating as the management authority of a managed device 106, can administer the operation of managed device 106 that are enrolled or otherwise registered with the edge management service 141. To this end, the management service 141 can also provide mechanisms for the managed device 106 or an offline client device 109 to enroll or otherwise register with the management service 141. The management can also install or cause to be installed various applications on the managed device 106 or offline client device 109 or for various configuration settings of the managed device 106 or offline client device 109 to be set to a specified value.

The management service 141 can distribute files to a client device 106 that is managed by the management service 141. For example, O/S patches or updates, executable files such as applications or application installers, documents, audio, video, or other content can be distributed by the management service 141 to managed devices.

The management service 121 can designate one or more instances of the edge management service 141 to operate as a fallback management service for a subset of managed devices 106 that are enrolled with the management service 121. The management service 121 or an administrator can assign managed devices 106 to a respective edge management service 141 based upon one or more proximity factors. Proximity factors can include a location in which a respective user is based, a network or location in which the user spends a plurality or majority of time, and edge management server 104 that is closest to a user's location at any given time based upon the user's calendar, or other location or proximity factors that can be discerned from the user's profile or historical usage data related to the user.

Based on historic user and device data seen at the location where the edge management server 104 is deployed and calendar information of users, all relevant information is synced from the existing management server 103 to the edge management server 104. This includes user info, device info, compliance information, policies, and also relevant logic/algorithms for checking device compliance. Accordingly, some part of the management data store 124 can be replicated to a respective edge management data store 144 associated with an assigned edge management server 104 for a particular set of devices. Each edge management data store 144 can be synchronized only with details of X number of users, with X being determined based on past user history or geographical closeness to user. This can be a continuous process with data syncs happening at regular intervals between the management data store 124 and the edge management data store 144 & edge management service 141 and management service 121 instances and the corresponding databases.

An administrator can also configure what policies, rules, and service should be available at edge management server 104 nodes. Edge management server 104 nodes can either be full-service nodes or even partial service nodes based on various factors such as devices to be managed, policies, computing capabilities of the edge management server 104, etc.

The edge management service 141 can also performs data sync periodic polling or pinging of the management service 121 to check if the management service 121 is reachable. Should the management service 121 that is the primary management authority for managed devices 106 become unreachable for a pre-defined period of time, one or more edge management server 104 can scale itself via an instance of the edge management service 141 running on the edge management server 104 to handle the incoming traffic from the managed devices 106 that a respective edge management server 104 is assigned as a fallback management authority.

On the device side, the management agent 136 on the managed devices 106 can be configured with a list of fallback edge management servers 104 that a respective managed device 106 can utilize as a fallback management server if the primary management server 103 becomes unreachable for a set period of time. Such a dynamically updated list of fallback servers can be set or ranked based on various factors such as one or more proximity factors including geographic proximity, network proximity, network latency to a respective edge management server 104, historical user or device location data, or future or projected user location based on calendar appointments. Data flow from the management agent 136 on the managed device 106 to the edge management server 104 can utilize the channels of HTTPS traffic sent by the management agent 136 to the edge management server 104 or can utilize short range communication channels such as Bluetooth if the managed device 106 is in close proximity to the edge management server 104.

Figure 2:
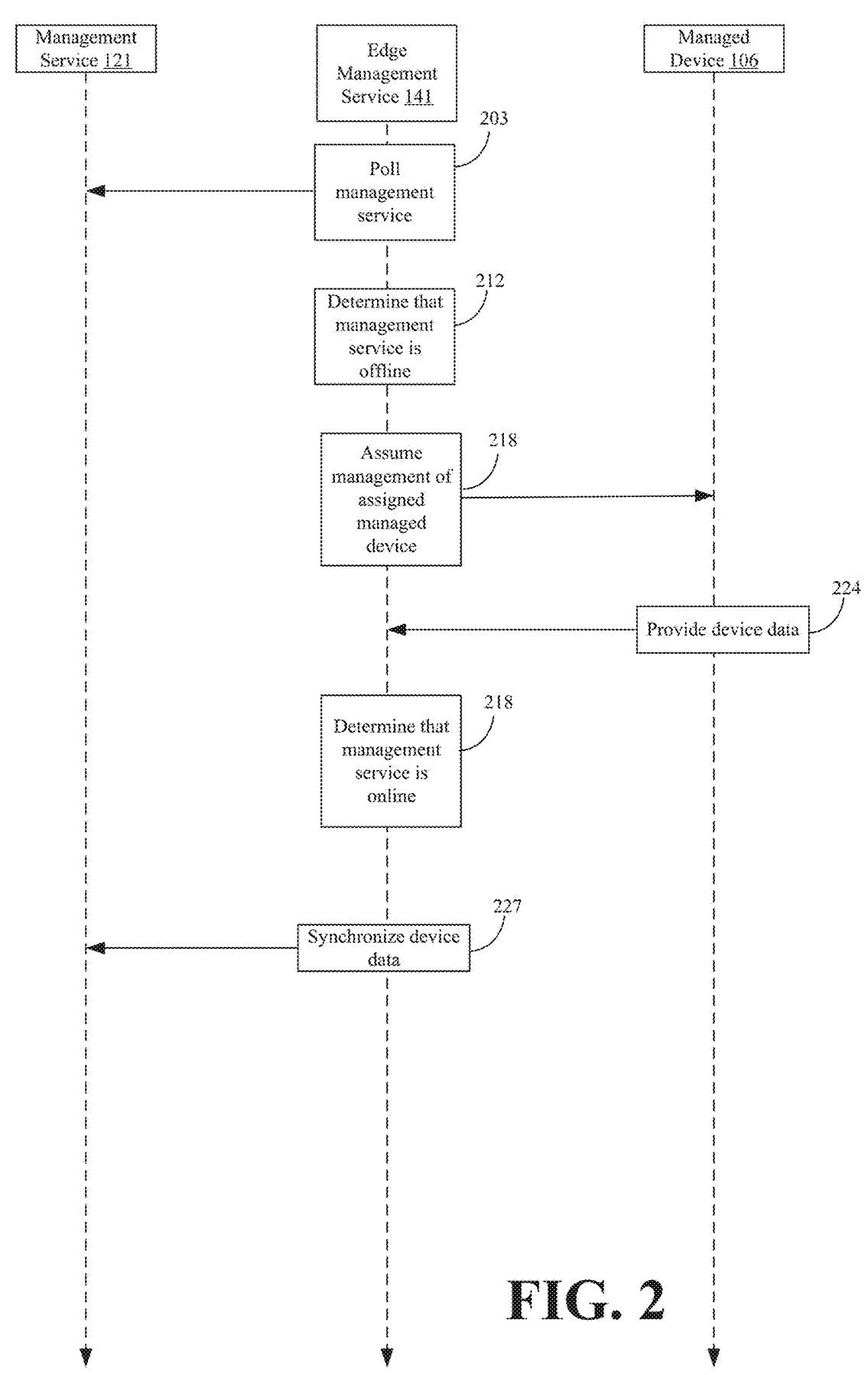
FIG. 2 shows sequence diagrams that provide examples of functionality implemented by components of the networked environment, according to various embodiments of the present disclosure.

FIG. 2 shows a sequence diagram that provides examples of functionality implemented by components of the networked environment 100. It is understood that the sequence diagram of FIG. 2 provides merely an example of the many different types of functional arrangements that can be employed to implement the portions of the networked environment 100 as described herein. As an alternative, the sequence diagram of FIG. 2 can be viewed as depicting an example of elements of a method implemented within the networked environment 100.

The management agent 136 on the managed devices can be configured with multiple nearby located edge management server 104 designated as additional fallback servers based upon geographical proximity, historic user location data, or future user location based on calendar appointments. For example, if the connection to the designated fallback edge management server 104 server 1 fails, the management agent 136 on the managed device 106 can automatically attempt a connection to the other fallback edge management servers configured (#2, #3 etc.).

Based on current user location, to minimize server latency, an edge management server 104 in proximity to the managed device 106 can sync related user and device information and policies from the designated fallback edge management server 104.

The various edge management servers 104 that are deployed can be setup such that they are only accessible via an intranet 113 on which the management server 103 and the one or more managed device 106 can access but one that external or malicious devices are unable to access. In this way, the likelihood of an edge management server 104 also being inaccessible by a managed device 106 can be lower than if the edge management server 104 is accessible via a public network 112.

Turning to FIG. 2 shown is a sequence diagram illustrating how an edge management service 141 can assume management of one or more managed device 106. The edge management service 141 can be assigned as a fallback management authority for one or more managed device 106 by the management service 121 or an administrator. The sequence diagram of FIG. 2 assumes that the management service 121 or an administrator has specified one or more edge management server 104 as a fallback management authority for one or more managed device 106 that is enrolled as a managed device with the management service 121. The edge management server 104 for a particular managed device 106 can be specified based upon one or more proximity factor, as described above.

At step 203, the edge management service 141 can periodically poll or ping the management service 121 that is designated as a primary management service 121 for a population of managed devices 106. The edge management service 141 can poll the management service 121 via the intranet 113. The polling period can be determined by an administrator as a configuration parameter of the edge management service 141.

At step 212, the edge management service 141 can determine that the management service 121 is offline. The edge management service 141 can make such a determination that the management service 121 is offline based upon whether the management service 121 is reachable via the network 112 or the intranet 113. If the management service 121 fails to respond to a polling request from the edge management service 141 after a predetermined amount of time, or if the management service 121 fails to respond to a certain quantity of polling requests consecutively or over a certain time period, the edge management service 141 can determine that the management service 121 is down or unreachable.

At step 218, once the edge management service 141 has determined that the management service 121 is unreachable, an assumption can be made that the population of managed devices 106 are also unable to reach the edge management service 141. Accordingly, the edge management service 141 can assume management of one or more of the managed devices 106 that are enrolled with the management service 121. By assuming management of the managed device 106, the edge management service 141 can obtain device state information, such as information about applications that are running or installed on the managed device 106, geographic location of the managed device 106, and other device heartbeat data that is typically provided to the management service 121. The edge management service 141 can also enforce and provide compliance rules, security policies, and perform other management tasks that the management service 121 typically performs. Device data can be stored in the edge management data store 144 on the edge management server 104 on which the edge management service 141 is running.

At step 224, the managed device 106 can provide the edge management service 141 with device state information that can be stored by the edge management service 141 in the edge management data store 144 on the edge management server 104. At step 228, the edge management service 141 can determine that the management service 121 is no longer offline. While acting as the management authority for one or more managed device 106, the edge management service 141 can remain polling the management service 121 until the management service 121 is reachable.

At step 230, once the management service 121 is reachable again, the edge management service 141 can synchronize device data with the management service 121 and yield management of the managed device 106 back to the management service 121.

Figure 3:
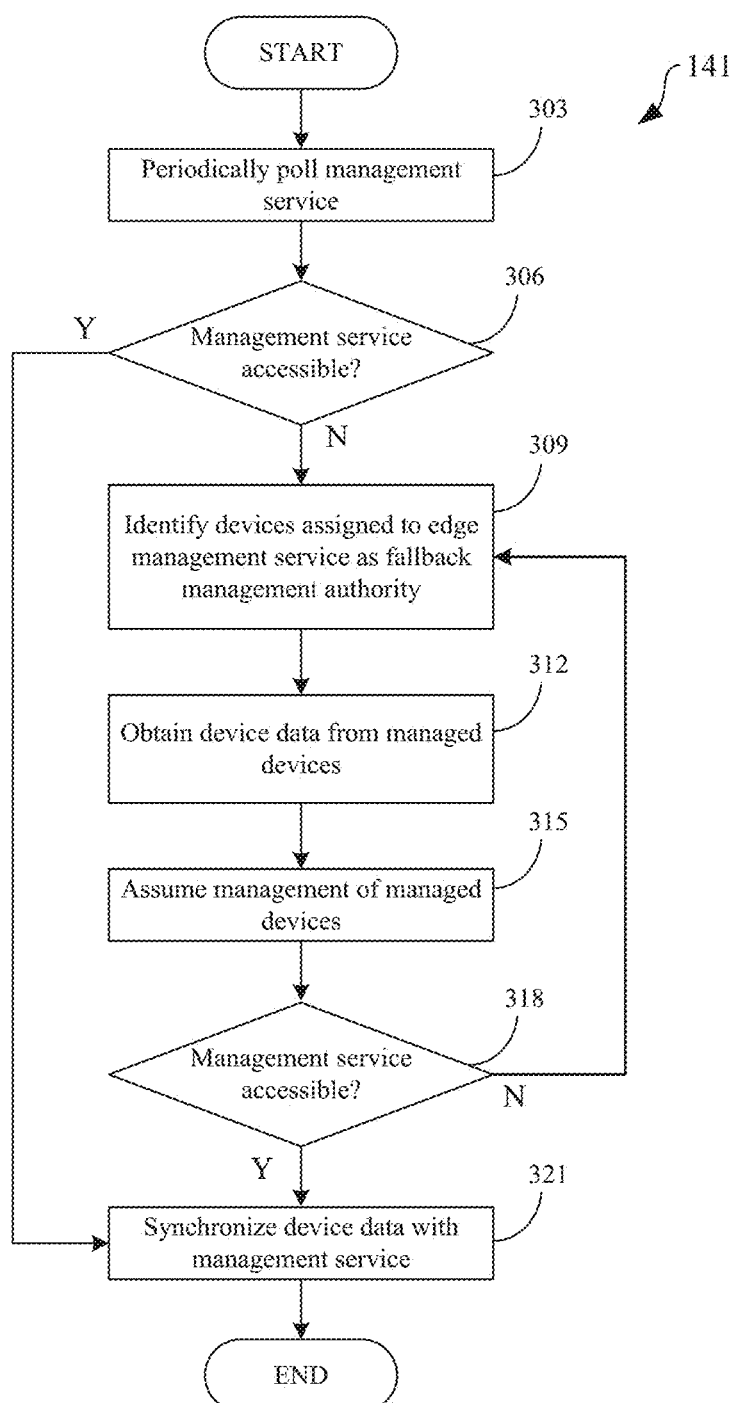
FIG. 3 shows a flowchart that provides an example of a portion of the operation of the networked environment, according to various embodiments of the present disclosure.

FIG. 3 shows a flowchart that provides an example of a portion of the operation of the edge management service 141. While the actions of the steps of FIG. 3 can be described as performed by a particular device or component, other components of the networked environment 100 can also perform aspects of the steps and actions.

At step 303, the edge management service 141 can periodically poll or ping the management service 121 that is designated as a primary management service 121 for a population of managed devices 106. The edge management service 141 can poll the management service 121 via the intranet 113. The polling period can be determined by an administrator as a configuration parameter of the edge management service 141.

At step 306, the edge management service 141 can determine that the management service 121 is offline. The edge management service 141 can make such a determination that the management service 121 is offline based upon whether the management service 121 is reachable via the network 112 or the intranet 113. If the management service 121 fails to respond to a polling request from the edge management service 141 after a predetermined amount of time, or if the management service 121 fails to respond to a certain quantity of polling requests consecutively or over a certain time period, the edge management service 141 can determine that the management service 121 is down or unreachable. If the management service 121 is determined to be online, the process can proceed to completion. If the management service 121 is determined to be offline, the process can proceed to step 306.

At step 306, if the management service 121 is inaccessible, the edge management service 141 can determine which of the managed devices 106 that have been assigned to the edge management service 141 as a fallback management service. The edge management service 141 can assume management of these managed devices 106 in the absence of the management service 121.

At step 312, the edge management service 141 can obtain device data and perform management functions on behalf of the management service 121 on the managed devices 106. The edge management service 141 can obtain heartbeat data or a device check-in from managed devices 106. A device check-in can comprise the managed device 106 sending device status data to the edge management service 141. A device check-in can take the form of a device identifier along with device status information that the management service can monitor, such as operating system version, network address, geolocation data, and other data from which the management service can determine whether the device requires any action to be taken on the device.

At step 315, the edge management service 141 can assume management of the managed devices 106 assigned to the edge management server 104 on which the instance of the edge management service 141 is running. By assuming management of the managed device 106, the edge management service 141 can obtain device state information, such as information about applications that are running or installed on the managed device 106, geographic location of the managed device 106, and other device heartbeat data that is typically provided to the management service 121. The edge management service 141 can also enforce and provide compliance rules, security policies, and perform other management tasks that the management service 121 typically performs. Device data can be stored in the edge management data store 144 on the edge management server 104 on which the edge management service 141 is running.

At step 318, the edge management service 141 can determine that the management service 121 is no longer offline. While acting as the management authority for one or more managed device 106, the edge management service 141 can remain polling the management service 121 until the management service 121 is reachable. If the management service 121 is still unreachable, the process can return to step 309 such that the edge management service 141 continues to manage the managed devices 106.

If the management service 121 has become reachable, the process can proceed to step 321, where the edge management service 141 can synchronize device data with the management service 121 and yield management of the managed device 106 back to the management service 121. Thereafter, the process can proceed to completion.

Functionality attributed to the executable components discussed herein can be implemented in a single process or application or in multiple processes or applications. The separation or segmentation of functionality as discussed herein is presented for illustrative purposes only.

Flowcharts and sequence diagrams can show examples of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts and sequence diagrams can show a specific order of execution, it is understood that the order of execution can differ from that which is shown. For example, the order of execution of two or more elements can be switched relative to the order shown. Also, two or more elements shown in succession can be executed concurrently or with partial concurrence. Further, in some examples, one or more of the elements shown in the flowcharts can be skipped or omitted.

The computing devices and other hardware components described herein can include at least one processing circuit. Such a processing circuit can include, for example, one or more processors and one or more storage devices that are coupled to a local interface. The local interface can include, for example, a data bus with an accompanying address/control bus or any other suitable bus structure.

The one or more storage devices for a processing circuit can store data or components that are executable by the one or more processors of the processing circuit. For example, the various executable software components can be stored in one or more storage devices and be executable by one or more processors. Also, a data store can be stored in the one or more storage devices.

The functionalities described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more of the components described herein that include software or program instructions can be embodied in any non-transitory computer-readable medium for use by or in connection with an instruction execution system such as a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in at least one computing device or by using multiple computing devices.

As used herein, "about," "approximately," and the like, when used in connection with a numerical variable, can generally refer to the value of the variable and to all values of the variable that are within the experimental error (e.g., within the 95% confidence interval for the mean) or within +/−10% of the indicated value, whichever is greater.

Where a range of values is provided, it is understood that each intervening value and intervening range of values, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

A phrase, such as "at least one of X, Y, or Z," unless specifically stated otherwise, is to be understood with the context as used in general to present that an item, term, etc., can be either X, Y, or Z, or any combination thereof (e.g., X, Y, and/or Z). Similarly, "at least one of X, Y, and Z," unless specifically stated otherwise, is to be understood to present that an item, term, etc., can be either X, Y, and Z, or any combination thereof (e.g., X, Y, and/or Z). Thus, as used herein, such phrases are not generally intended to, and should not, imply that certain embodiments require at least one of either X, Y, or Z to be present, but not, for example, one X and one Y. Further, such phrases should not imply that certain embodiments require each of at least one of X, at least one of Y, and at least one of Z to be present.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All such modifications and variations are intended to be included herein within the scope of this disclosure.

The invention claimed is:

1. A computer system comprising:
a management computer including a processor and memory; and
a plurality of edge management computers each including a processor and memory,
wherein the management computer is configured to execute instructions stored in the memory of the management computer to execute a management service, including performing the following steps:
identify the edge management computers, which are executing an edge management service;
identify a population of managed devices configured to be remotely managed by the management service; and
assign each of the managed devices to a respective one of the edge management computers based upon at least one proximity factor, and wherein the edge management computers are configured to execute instructions stored in the memory of the edge management computers to execute the edge management service, including performing the following steps:
synchronize data corresponding to respective managed devices with the management service;
periodically poll the management service to determine whether the management service is unreachable over a network connection between the edge management computers and the management computer; and
in response to determining that the management service is unreachable over the network connection, assume management of the managed devices, including instructing each of the managed devices to communicate with a respective one of the edge management computers.

2. The computer system of claim 1, wherein the at least one proximity factor comprises locations assigned to users of the managed devices.

3. The computer system of claim 1, wherein the management service assigns each of the managed devices to a respective one of the edge management computers based upon a geographic proximity to the respective one of the edge management computers.

4. The computer system of claim 1, wherein
the edge management service determines that the management service is unreachable over the network connection for a predetermined period of time, and
the edge management service further redirects the managed devices to the management service in response to the management service becoming reachable over the network connection.

5. The computer system of claim 4, wherein upon assuming management of the managed devices, the edge management computers communicate with the managed devices over hypertext transfer protocol (HTTP) channels or short-range communication channels.

6. The computer system of claim 4, wherein the edge management service synchronizes device data and user data with the management service during a period of time in which the edge management service assumes management of the managed devices.

7. A method, comprising:
identifying, by a management computer, a plurality of edge management computers executing an edge management service;
identifying, by the management computer, a population of managed devices configured to be remotely managed by a management service running on the management computer;
assigning each of the managed devices to a respective one of the edge management computers based upon at least one proximity factor;
synchronizing, by the edge management computers, data corresponding to respective managed devices with the management service;
periodically polling, by the edge management computers, the management service to determine whether the management service is unreachable over a network connection between the edge management computers and the management computer; and
in response to determining that the management service is unreachable over the network connection, assuming, by the edge management computers, management of the managed devices, including instructing each of the managed devices to communicate with a respective one of the edge management computers.

8. The method of claim 7, wherein the at least one proximity factor comprises locations assigned to users of the managed devices.

9. The method of claim 7, further comprising:

assigning, by the management computer, each of the managed devices to a respective one of the edge management computers based upon a geographic proximity to the respective one of the edge management computers.

10. The method of claim 7, further comprising:

determining, by the edge management computers, that the management service is unreachable over the network connection for a predetermined period of time; and redirecting, by the edge management computers, the managed devices to the management service in response to the management service becoming reachable over the network connection.

11. The method of claim 10, further comprising:

upon assuming management of the managed devices, communicating, by the edge management computers with the managed devices, over hypertext transfer protocol (HTTP) channels or short-range communication channels.

12. The method of claim 10, further comprising:

synchronizing, by the edge management computers, device data and user data with the management service during a period of time in which the edge management service assumes management of the managed devices.

13. One or more non-transitory computer-readable media embodying program instructions that, when executed, cause a management computer and a plurality of edge management computers to at least:

identify the edge management computers, which are executing an edge management service;

identify a population of managed devices configured to be remotely managed by a management service;

assign each of the managed devices to a respective one of the edge management computers based upon at least one proximity factor;

synchronize, by the edge management computers, data corresponding to respective managed devices with the management service;

periodically poll the management service to determine whether the management service is unreachable over a network connection between the edge management computers and the management computer; and in response to determining that the management service is unreachable over the network connection, assume management of the managed devices by the edge management computers, including instructing each of the managed devices to communicate with a respective one of the edge management computers.

14. The one or more non-transitory computer-readable media of claim 13, wherein the at least one proximity factor comprises locations assigned to users of the managed devices.

15. The one or more non-transitory computer-readable media of claim 13, wherein the management service assigns each of the managed devices to a respective one of the edge management computers based upon a geographic proximity to the respective one of the edge management computers.

16. The one or more non-transitory computer-readable media of claim 13, wherein the edge management service determines that the management service is unreachable over the network connection for a predetermined period of time, and the edge management service further redirects the managed devices to the management service in response to the management service becoming reachable over the network connection.

17. The one or more non-transitory computer-readable media of claim 16, wherein upon assuming management of the managed devices, the edge management computers communicate with the managed devices over hypertext transfer protocol (HTTP) channels or short-range communication channels.

18. The one or more non-transitory computer-readable media of claim 16, wherein the edge management service synchronizes device data and user data with the management service during a period of time in which the edge management service assumes management of the managed devices.

* * * * *